(12) United States Patent
Yasuda et al.

(10) Patent No.: US 7,430,915 B2
(45) Date of Patent: Oct. 7, 2008

(54) VIBRATION SENSOR

(75) Inventors: Mamoru Yasuda, Osaka (JP); Yasuo Sugimori, Osaka (JP); Takahisa Ohtsuji, Osaka (JP)

(73) Assignee: Hosiden Corporation, Osaka (JP)

( * ) Notice: Subject to any disclaimer, the term of this patent is extended or adjusted under 35 U.S.C. 154(b) by 221 days.

(21) Appl. No.: 10/562,385

(22) PCT Filed: Aug. 31, 2004

(86) PCT No.: PCT/JP2004/012512
§ 371 (c)(1),
(2), (4) Date: Dec. 27, 2005

(87) PCT Pub. No.: WO2005/024360
PCT Pub. Date: Mar. 17, 2005

(65) Prior Publication Data
US 2006/0137455 A1  Jun. 29, 2006

(30) Foreign Application Priority Data
Sep. 2, 2003  (JP)  ............. 2003-310265

(51) Int. Cl.
*G01P 15/125* (2006.01)
(52) U.S. Cl. ............. 73/652; 73/514.01; 73/514.32
(58) Field of Classification Search .......... 73/649, 73/651, 652, 654, 514.01, 514.32, 514.38
See application file for complete search history.

(56) References Cited

U.S. PATENT DOCUMENTS 3,352,157 A * 11/1967 Seegmiller ............. 73/724
4,338,823 A * 7/1982 Iwasaki ............. 73/654
5,798,460 A * 8/1998 Nakagawa et al. ............. 73/654
7,194,905 B2 * 3/2007 Yamamoto et al. ....... 73/514.32
2006/0053888 A1 * 3/2006 Sugimori et al. ......... 73/514.16
2006/0150739 A1 * 7/2006 Yasuda et al. ............. 73/654

FOREIGN PATENT DOCUMENTS

| JP | 59079700 | | 5/1984 |
| JP | 60-214104 | | 10/1985 |
| JP | 03112170 A | * | 5/1991 |
| JP | 06058949 | | 3/1994 |
| JP | 10009944 | | 1/1998 |
| JP | 11248737 | | 9/1999 |
| JP | 2001267588 | | 9/2001 |
| WO | WO 2004019049 A1 | * | 3/2004 |

* cited by examiner

*Primary Examiner*—Hezron E. Williams
*Assistant Examiner*—Rose M Miller
(74) *Attorney, Agent, or Firm*—The Webb Law Firm

(57) ABSTRACT

A vibration sensor capable of preventing a diaphragm electrode from being damaged without lowering sensitivity as well as realizing a satisfactory assembling process. The vibration sensor includes a fixed electrode 1, and a diaphragm electrode 3 having a weight member 2 attached to a membrane surface facing away from the fixed electrode 1 and fixedly supported at peripheries thereof, the vibration sensor being capable of outputting variation of capacitance between the fixed electrode and the diaphragm electrode as vibration signals. The vibration sensor further includes projecting portions 2*a* formed on parts of an end portion of the weight member 2 to project along the direction of the membrane surface and spaced from the membrane surface of the diaphragm electrode 3, and a restricting member 4 for contacting the projecting portions 2*a* of the weight member 2 displaced along the direction of the membrane surface of the diaphragm electrode 3, thereby to restrict displacement of the weight member 2.

4 Claims, 5 Drawing Sheets

VIBRATION SENSOR

BACKGROUND OF THE INVENTION

1. Field of the Invention

The present invention relates to a vibration sensor comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals.

2. Description of Related Art

The above-noted vibration sensor is a vibration sensor of the electret condenser microphone type (ECM type) usable for a pedometer, for example. Conventionally, a weight member in the form of a thin cylindrical member or the like is attached to the diaphragm electrode in order to detect low frequency vibrations generated in time of walking and the like. Also, a relatively large gap is defined between an end portion of the plate-shaped weight member and a diaphragm ring fixedly supporting the diaphragm electrode at peripheries thereof, or between the weight member and a circuit board arranged on a back side of the weight member (see Patent Document 1 and Patent Document 2, for example).

Patent Document 1: Patent Application "Kokai" No. 59-70700

Patent Document 2: Patent Application "Kokai" No. 10-9944

SUMMARY OF THE INVENTION

However, as noted above, a relatively large gap is defined between the end portion of the weight member and the diaphragm ring, or between the weight member and the circuit board, which incurs a risk of damaging the sensor by a great force applied to the diaphragm electrode when the sensor is dropped to receive an excessive shock to the point of moving the weight member by a large amount. Specifically, when the weight member has a sharp corner portion at the end portion thereof, such an end corner portion contacts and easily damages the diaphragm electrode when the weight member is attached to the diaphragm electrode. Also, the diaphragm electrode is easily damaged by stress concentration when a shock is applied.

On the other hand, it is possible to increase an inertial force by increasing the weight of the weight member thereby to enhance the sensitivity of the sensor. However, it is not advantageous to merely increase the diameter of the cylindrical weight member because the width of a movable portion formed outwardly of the diaphragm electrode is reduced even though the weight is increased. When the height of the cylindrical weight member is increased, the moment caused by a shock occurring when the sensor is dropped or the like is also increased, as a result of which the diaphragm electrode is easily damaged.

The present invention has been made having regard to the above-noted problems, and its object is to provide a vibration sensor capable of preventing a diaphragm electrode from being damaged without lowering sensitivity, as well as realizing a satisfactory assembling process.

In order to achieve the above object, a first characteristic feature of a vibration sensor according to the present invention lies in comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals, wherein the vibration sensor further comprises projecting portions formed on parts of an end portion of the weight member to project along a direction of the membrane surface and spaced from the membrane surface of the diaphragm electrode, and a restricting member for contacting the projecting portions of the weight member displaced along the direction of the membrane surface of the diaphragm electrode thereby to restrict displacement of the weight member.

When the weight member receives a shock, as the sensor is dropped, to be displaced along a direction of the membrane surface of the diaphragm electrode, the projecting portions formed on the end portion of the weight member contact the restricting member thereby to restrict a large displacement of the weight member. Thus, the diaphragm electrode is prevented from being damaged by displacement of the weight member along the direction of the membrane surface.

On the other hand, the projecting portions project along the direction of the membrane surface and are spaced from the membrane surface of the diaphragm electrode to secure a movable portion in the diaphragm electrode between the portion where the end portion of the weight member is attached and the fixed peripheral portion. Thus, the weight member is not prevented from moving along directions perpendicular to the direction of the membrane surface of the diaphragm electrode by vibrations to be detected, thereby avoiding a lowering of sensitivity. The sensitivity is improved by the increase in the weight of the weight member due to formation of the projecting portions.

Further, the projecting portions are formed on parts of the end portion of the weight member and not formed on the entire end portion to produce a gap between the end portion having no projecting portion and the restricting member. Air enters and exits through the gap when the weight member is moved, thereby to allow a smooth movement of the weight member. Thus, a lowering of sensitivity can be avoided.

At the same time, since the projecting portions are formed on parts of the end portion of the weight member, it is possible to position the weight member relative to the diaphragm electrode while the weight member is held by a jig or the like inserted into the gap between the end portion of the weight member having no projecting portion and the restricting member in time of attaching the weight member to the diaphragm electrode. By contrast, it would be difficult to position the weight member while being held, where the projecting portions are formed on the entire end portion of the weight member.

Hence, it is possible to provide the vibration sensor capable of preventing damage to the diaphragm electrode while avoiding a lowering of sensitivity, and also allowing a satisfactory assembling process.

A second characteristic feature of the vibration sensor according to the present invention lies in comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals, wherein the vibration sensor further comprises restricting members for contacting end portion of the weight member displaced along the direction of the membrane surface of the diaphragm electrode, thereby to restrict displacement of the weight member, the restricting members being formed on parts opposed to the end portion of the weight member and spaced from the membrane surface of the diaphragm electrode.

When the weight member receives a shock, as the sensor is dropped, to be displaced along a direction of the membrane surface of the diaphragm electrode, the end portion of the weight member contacts the restricting members, thereby to restrict a large displacement of the weight member. Thus, the diaphragm electrode is prevented from being damaged by displacement of the weight member along the direction of the membrane surface.

On the other hand, the restricting members are arranged to be spaced from the membrane surface of the diaphragm electrode to secure a movable portion in the diaphragm electrode between the portion where the end portion of the weight member is attached and the fixed peripheral portion. Thus, the weight member is not prevented from moving along the directions perpendicular to the direction of the membrane surface of the diaphragm electrode by vibrations to be detected, thereby avoiding a lowering of sensitivity.

Further, the restricting members are formed on parts opposed to the end portion of the weight member and not opposed to the entire end portion to produce gaps between the end portion having no restricting member and the restricting members. Air enters and exits through the gaps when the weight member is moved to allow a smooth movement of the weight member, thereby avoiding a lowering of sensitivity.

At the same time, since the restricting members are formed on parts opposed to the end portion of the weight member, it is possible to position the weight member relative to the diaphragm electrode while the weight member is held by a jig or the like inserted into a gap between the end portion of the weight member and the restricting members in time of attaching the weight member to the diaphragm electrode. By contrast, it would be difficult to position the weight member while being held, where the restricting members are opposed to the entire end portion of the weight member.

Hence, it is possible to provide the vibration sensor capable of preventing damage to the diaphragm electrode while avoiding a lowering of sensitivity, and also allowing a satisfactory assembling process.

A third characteristic feature of the vibration sensor according to the present invention lies in that, in addition to the above first or second feature, the sensor further comprises a second restricting member for contacting a surface of the weight member displaced along a direction perpendicular to the membrane surface of the diaphragm electrode, thereby to restrict displacement of the weight member.

When the weight member receives a shock, as the sensor is dropped, to be displaced excessively in a direction perpendicular to the membrane surface of the diaphragm electrode, the surface of the weight member contacts the second restricting member to restrict displacement of the weight member. Thus, the diaphragm electrode is prevented from being damaged by excessive displacement of the weight member in the direction perpendicular to the membrane surface.

Hence, a further preferred embodiment of the vibration sensor is provided which is capable of preventing the diaphragm electrode from being damaged by displacement of the weight member along the direction perpendicular to the membrane surface as well as displacement of the weight member along the direction of the membrane surface.

A fourth characteristic feature of the vibration sensor according to the present invention lies in that, in addition to the above third feature, the sensor further comprises a circuit board having an output circuit mounted thereon for vibration signals, wherein the circuit board or an electronic part mounted on the circuit board acts also as the second restricting member.

When the circuit board having the output circuit for outputting variations of capacitance between the fixed electrode and the diaphragm electrode as vibration signals is provided within the sensor, the circuit board per se or the electronic parts mounted on the circuit board acts as the second restricting member as well. Thus, any second restricting member for exclusive use is dispensable thereby to simplify the construction.

Hence, a further preferred embodiment is provided which is capable of preventing the diaphragm electrode from being damaged by displacement of the weight member along the direction perpendicular to the membrane surface through the simplified construction.

A fifth characteristic feature of the vibration sensor according to the present invention lies in comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals, wherein the weight member includes a corner portion contacting the diaphragm electrode and having a sectional shape forming an obtuse angle with the membrane surface of the diaphragm electrode.

When the sensor is dropped and the weight member receives a shock to be displaced, the corner portion of the end portion of the weight member contacting the diaphragm electrode is pressed against the diaphragm electrode. Since the corner portion has a sectional shape forming an obtuse angle with the membrane surface of the diaphragm electrode, the corner portion formed on the end portion of the weight member contacts the membrane surface of the diaphragm electrode softly, which can avoid a stress concentration on a part of the diaphragm electrode, thereby to avoid damage to the diaphragm electrode. At this time, a movable portion is secured in the diaphragm electrode between the portion where the end portion of the weight member is attached and the fixed peripheral portion, which does not hinder movement of the weight member operated by vibrations to be detected. Thus, sensitivity is not lowered.

Hence, it is possible to provide the vibration sensor capable of preventing the diaphragm electrode from being damaged while avoiding a lowering of sensitivity.

A sixth characteristic feature of the vibration sensor according to the present invention lies in comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals, wherein the diaphragm electrode includes a corrugated portion between an inner portion where the weight member is attached and an outer portion fixedly supported.

When the sensor is dropped and the weight member receives a shock to be displaced, the corrugated portion formed on the diaphragm electrode between the inner portion where the weight member is attached and the outer portion fixedly supported extends and contracts in the directions of the membrane surface of the diaphragm electrode, or oscillates in directions perpendicular to the membrane surface of the diaphragm electrode, thereby to absorb excessive displacements of the weight member caused by the shock. Thus, it can avoid am stress concentration on the diaphragm electrode and prevent the diaphragm electrode from being damaged. At the same time, the corrugated portion can secure a movable portion for the diaphragm electrode, which allows a smooth movement of the weight member operated by vibrations to be detected and performs an effect of increasing sensitivity.

Hence, it is possible to provide the vibration sensor capable of preventing the diaphragm electrode from being damaged, while avoiding a lowering of sensitivity.

DESCRIPTION Of PREFERRED EMBODIMENTS

Vibration sensors embodying the present invention will be described with reference to the drawings.

First Embodiment

Figure 1:
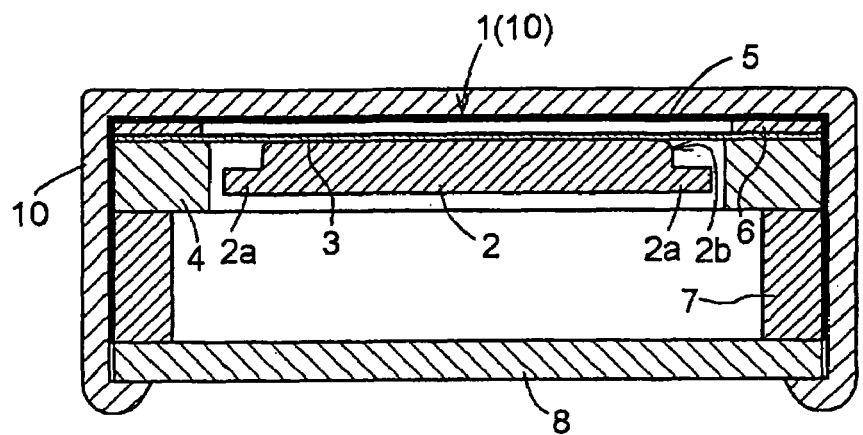
FIG. 1 A sectional view showing a construction of a vibration sensor according to a first embodiment.

As shown in FIG. 1, a vibration sensor according to a first embodiment comprises a fixed electrode 1, and a diaphragm electrode 3 having a weight member 2 in the form of a thin cylindrical member attached to a membrane surface facing away from the fixed electrode 1 and fixedly supported at peripheries thereof. The vibration sensor is capable of outputting variations of capacitance between the fixed electrode 1 and the diaphragm electrode 3 as vibration signals. Projecting portions 2a are formed on parts of an end portion of the weight member 2 to project along the direction of the membrane surface and spaced from the membrane surface of the diaphragm electrode 3. A diaphragm ring 4 is mounted adjacent the end portion of the weight member 2 for contacting the projecting portions 2a of the weight member 2 displaced along the direction of the membrane surface of the diaphragm electrode 3 to act as a restricting member for restricting displacement of the weight member 2.

The above-noted fixed electrode 1 is provided by a bottom portion of a housing 10 having a U-shaped section with an electret layer 5 formed on an inner surface thereof. Successively stacked on the bottom portion of the housing 10 are a ring-shaped plastic spacer 6, the above diaphragm electrode 3, the diaphragm ring 4 and an electrode ring 7. Then, the weight member 2 is inserted into an inner space of the diaphragm ring 4 and applied to the diaphragm electrode 3. Lastly, the housing 10 is covered with and secured to a circuit board 8 having an output circuit mounted thereon for vibration signals, thereby to assemble the vibration sensor. In this arrangement, the diaphragm electrode 3 is fixedly supported and held between the spacer 6 and the diaphragm ring 4 at the peripheries thereof. The housing 10, the diaphragm ring 4 and the electrode ring 7 are made of metal.

The diaphragm electrode 3 comprises an electrode layer formed of a high polymer resin film material of approximately 2 micrometers in thickness, for example, and having one surface (the lower surface in FIG. 1) coated with a metal such as Ni, Al, Ti or the like by vapor evaporation. The electrode layer allows the diaphragm electrode 3 to be conductive with the diaphragm ring 4.

Figure 2:
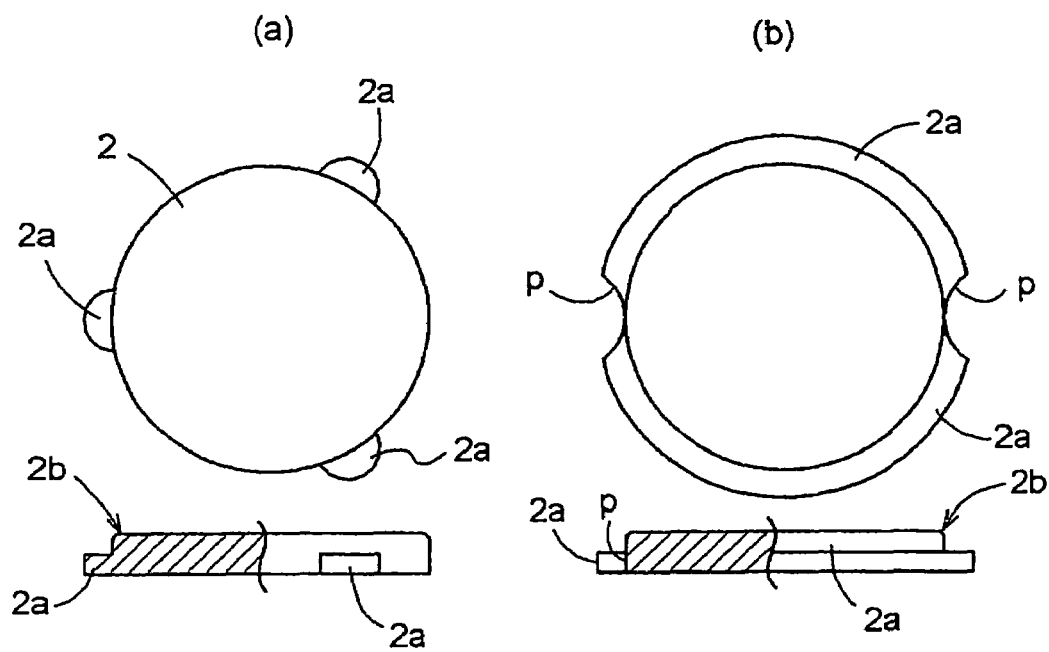
FIG. 2 Plan views and sectional views showing the construction of the vibration sensor according to the first embodiment.

The projecting portions 2a formed on parts of the end portion of the weight member 2, specifically, are formed as three claw-shaped portions arranged in positions of rotational symmetry of 120 degrees around the end portion of the weight member 2 having a cylindrical shape in plan view as shown in FIG. 2(a), or as a flange-shaped portion having two cutout portions p opposed to each other in a plate-surface direction over the entire circumference of the end portion of the weight member 2 having a cylindrical shape in plan view as shown in FIG. 2(b). Therefore, it is possible to place a jig such as tweezers to contact the end portion of the weight member 2 in positions other than the claw-shaped portions or the flange-shaped portions thereby to hold the weight member 2. In this condition, the weight member 2 is inserted into the inner space of the diaphragm ring 4 and positioned in place to be applied to the diaphragm electrode 3.

Further, as illustrated in FIG. 1, the weight member 2 has a corner portion 2b contacting the diaphragm electrode 3 and having a sectional shape forming an obtuse angle with the membrane surface of the diaphragm electrode 3. In the drawing, one example of the corner portion 2b is shown as a curved portion where the angle is gradually varied (sagged). Instead, the corner portion 2b may be chamfered.

Second Embodiment

A vibration sensor according to a second embodiment of the present invention is different from that of the first embodiment in that the former provides a construction for restricting displacement of the weight member 2 in directions perpendicular to the membrane surface of the diaphragm electrode 3 in addition to displacement of the weight member 2 in the directions along the membrane surface of the diaphragm electrode 3.

Figure 3:
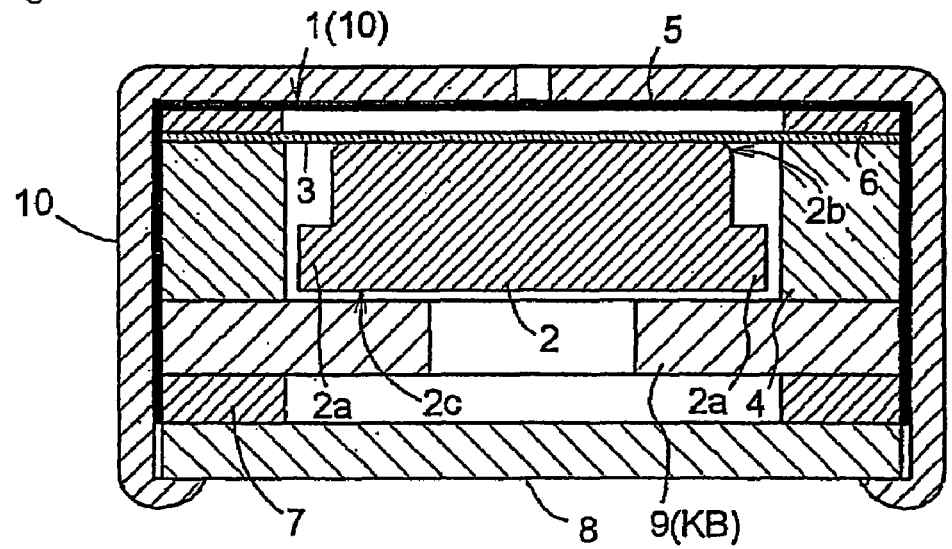
FIG. 3 A sectional view showing a construction of a vibration sensor according to a second embodiment.

More particularly, as illustrated in FIG. 3, a limit ring 9 is provided acting as a second restricting member KB for contacting a surface 2c of the weight member 2 displaced along directions perpendicular to the membrane surface of the diaphragm electrode 3, thereby to restrict displacement of the weight member 2. The limit ring 9 is arranged to be sandwiched between the diaphragm ring 4 and the electrode ring 7 and has an opening formed in the center thereof. Thus, air enters and exits through the opening of the limit ring 9 smoothly, which diminishes viscosity resistance (stiffness) of the diaphragm electrode 3 in time of displacement thereof thereby to increase amplitude.

Figure 4:
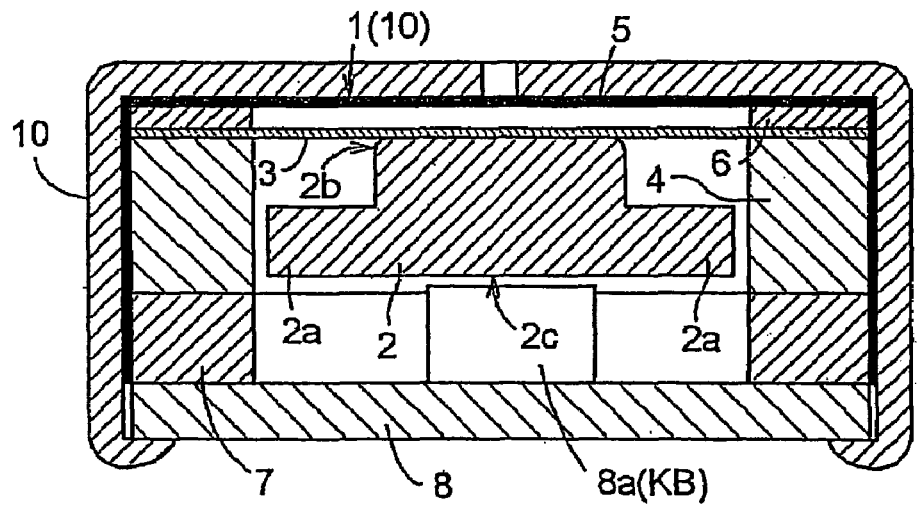
FIG. 4 A sectional view showing a modified construction of the vibration sensor according to the second embodiment.
Figure 6:
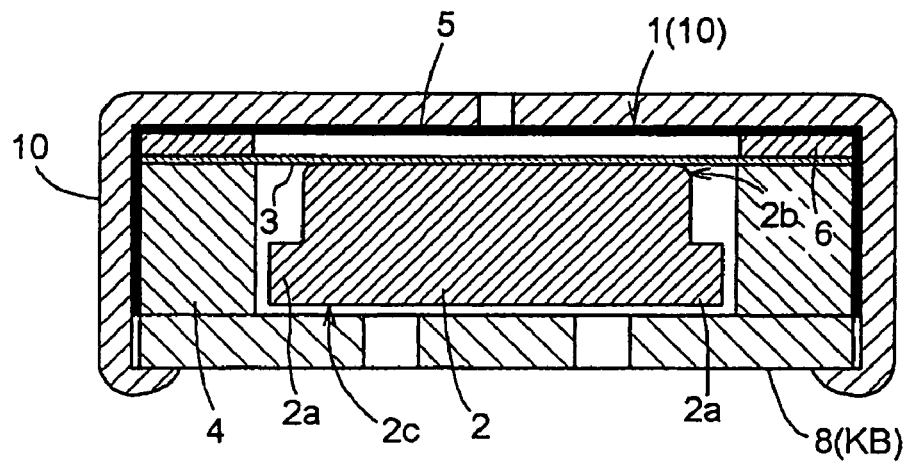
FIG. 6 A sectional view showing a modified construction of the vibration sensor according to the second embodiment.

FIG. 4 and FIG. 6 show modified constructions of the vibration sensor according to the second embodiment.

Figure 5:
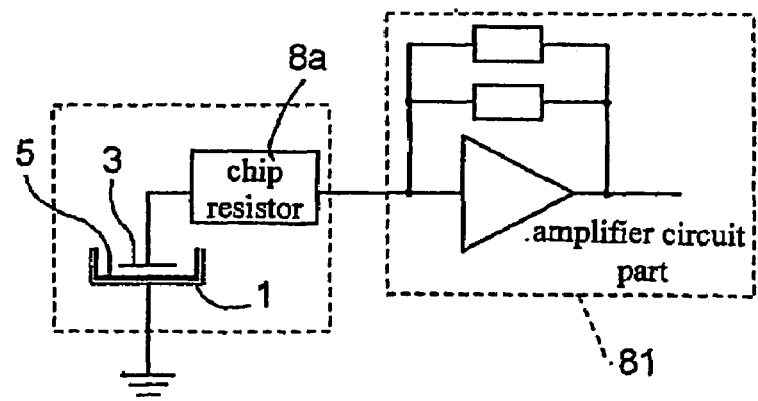
FIG. 5 A schematic diagram showing an output circuit for vibration signals of the vibration sensor according to the second embodiment.

With reference to FIG. 4, the circuit board 8 having the output circuit for vibration signals includes electronic parts 8a mounted thereon which act also as the second restricting member KB. The electronic parts include passive components such as a chip resistor and a chip condenser, active components such as a transistor and an FET (field effect transistor), an IC (integrated circuit) and the like. FIG. 5 shows a schematic diagram of the output circuit for vibration signals. The circuit board 8 has only a chip resistor 8a mounted thereon in order to save electricity consumed in the vibration sensor. An amplifier circuit part 81 consisting of an FET, an operational amplifier IC and the like is provided separately from the vibration sensor. When the amplifier circuit part 81 is provided separately from the vibration sensor in this manner, the circuit board 8 has only the chip resistor 8a mounted thereon thereby to produce a large space. As a result, back chamber capacitance of the diaphragm electrode 3 increases in time of displacement, thereby to improve sensor sensitivity.

With reference to FIG. 6, the above-noted circuit board 8 acts as the second restricting member KB as well. The circuit board 8 has an opening formed therein in order to diminish viscosity resistance (stiffness) of the diaphragm electrode 3 in time of displacement. In this case, it is preferable to provide electronic parts required to be mounted on the circuit board 8, on a surface thereof which is not opposed to the weight member 2.

Third Embodiment

A vibration sensor according to a third embodiment of the present invention is different from that of the first embodiment in that the diaphragm electrode 3 includes a movable portion having a shape for absorbing shocks.

Figure 7:
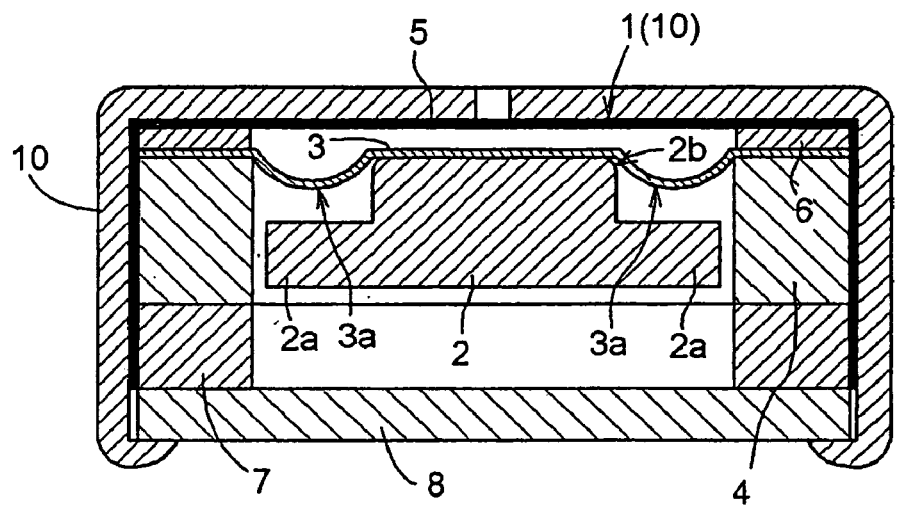
FIG. 7 A sectional view showing a construction of a vibration sensor according to the third embodiment.

More particularly, as shown in FIG. 7, the diaphragm electrode 3 includes a corrugated portion (corrugation) 3a between an inner portion where the weight member 2 is attached and an outer portion fixedly supported. The corrugated portion 3a is bulged away from the fixed electrode 1 (downward in the drawing) and placed between the diaphragm electrode 3 and the projections 2a so as not to contact the electret layer 5 in time of vibration. The above corrugated portion 3a absorbs shocks applied to the diaphragm electrode 3 and improves movability performance of the diaphragm electrode 3. Further, it is also possible to increase the thickness of the diaphragm electrode 3 (increase the thickness from 2 micrometers to 4 micrometers—12 micrometers, for example) without lowering the movability performance of the diaphragm electrode 3, which enhances the effect of preventing damage to the membrane.

Fourth Embodiment

In a vibration sensor according to a fourth embodiment of the present invention, the construction for restricting displacement of the weight member 2 in the directions along the membrane surface of the diaphragm electrode 3 is different from that of the first embodiment.

Figure 8:
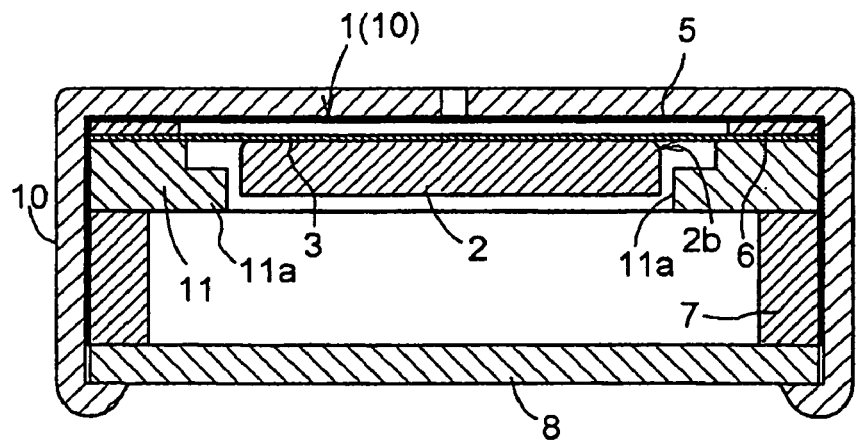
FIG. 8 A sectional view showing a construction of a vibration sensor according to a fourth embodiment.
Figure 9:
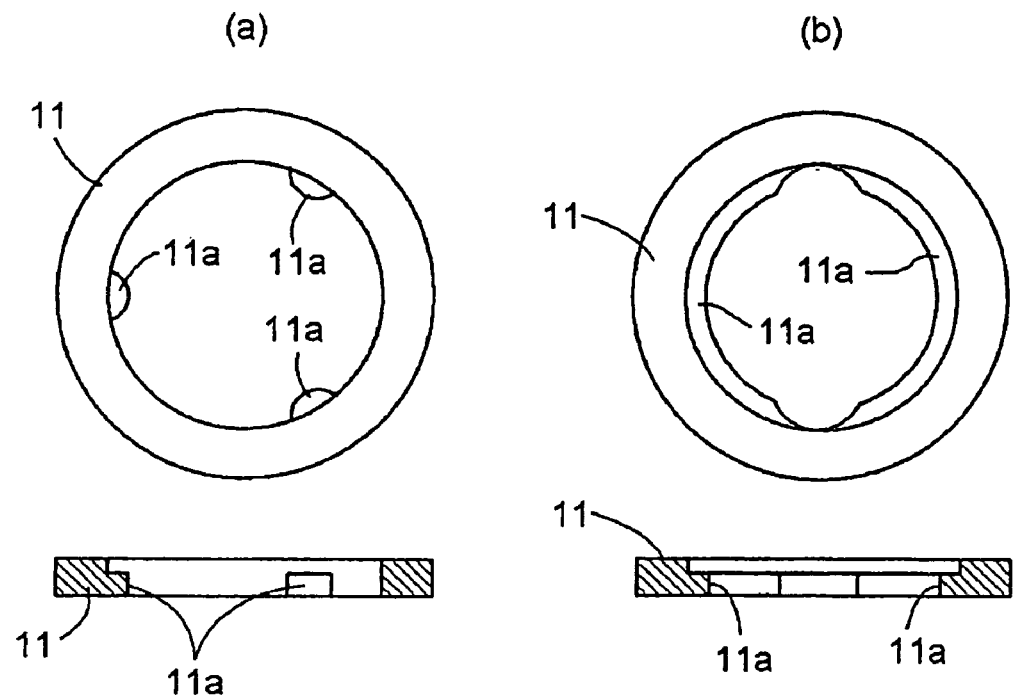
FIG. 9 Plan views and sectional views showing the construction of the vibration sensor according to the fourth embodiment.

More particularly, as shown in FIG. 8, the sensor includes limit members 11a for contacting end portions of the weight member 2 displaced along the direction of the membrane surface of the diaphragm electrode 3, thereby to restrict displacement of the weight member 2. The limit members 11a are formed in parts opposed to the end portions of the weight member 2 to be spaced from the membrane surface of the diaphragm electrode 3. As illustrated in FIGS. 9(a) and 9(b), the limit members 11a comprise claw-shaped portions or flange-shaped portions formed on inner peripheries of the diaphragm ring 11 in a manner similar to the first embodiment.

Further Embodiments

Vibration sensors according to further embodiments of the invention will be described next.

Figure 10:
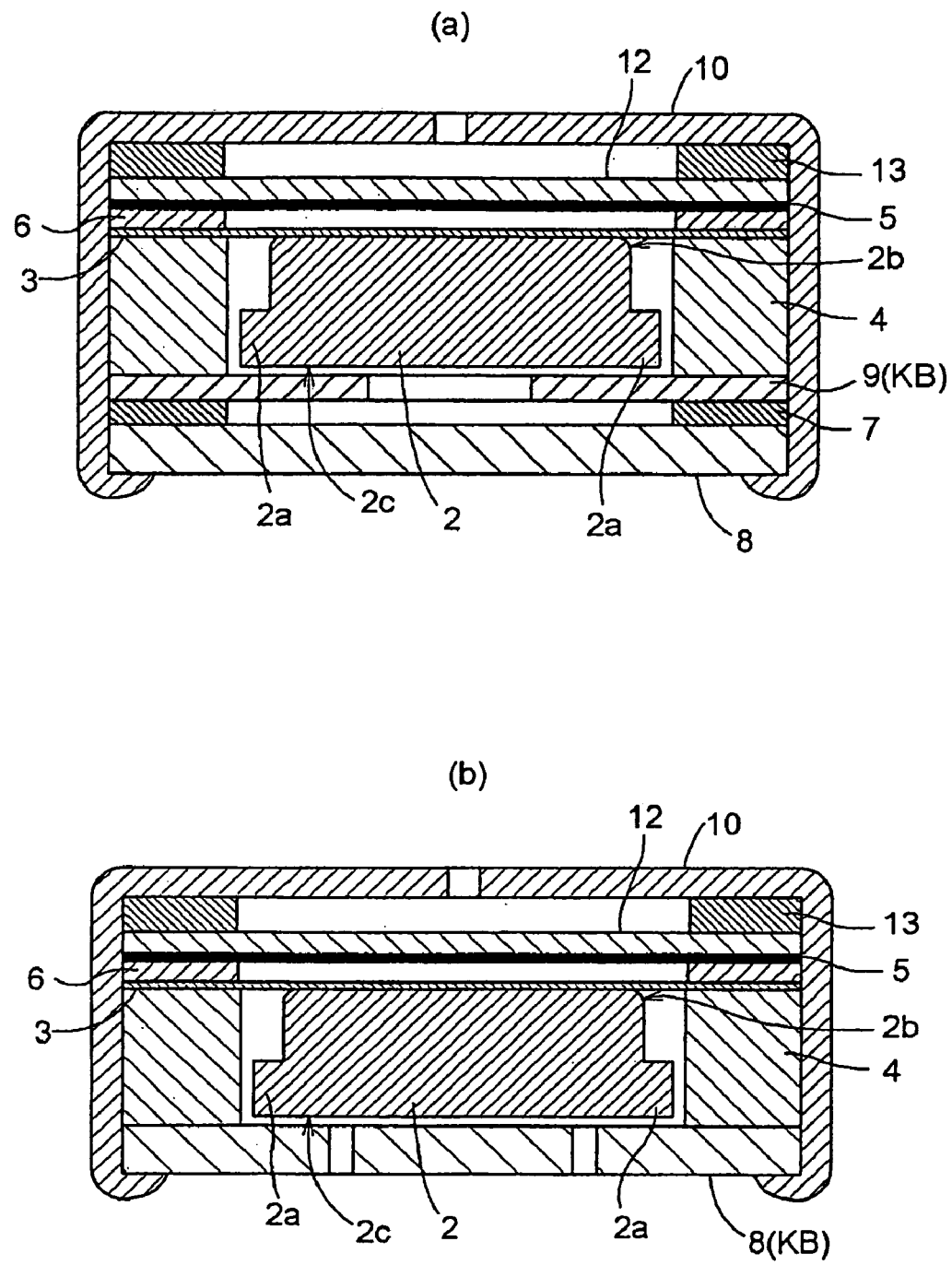
FIG. 10 Sectional views showing constructions of vibration sensors according to further embodiments.

In the foregoing embodiments, the fixed electrode 1 is formed utilizing the inner wall of the housing 10. Instead, as shown in FIG. 10, a separate fixed electrode 12 may be provided apart from the housing 10. The fixed electrode 12 may be supported by the housing 10 through a metal ring 13, and may have an electret layer 5 formed on the surface opposed to the diaphragm electrode 3. In FIG. 10(a), a limit ring 9 is provided to act as the second restricting member KB for restricting displacement of the weight member 2 in the directions perpendicular to the membrane surface of the diaphragm electrode 3. In FIG. 10(b), the circuit board 8 also acts as the second restricting member KB to provide a low thin-back type sensor having a reduced height.

The present invention may be applied to a vibration sensor for detecting vibrations, an acceleration sensor for detecting rates of acceleration, and a vibration detecting device, an acceleration detecting device, a pedometer and the like incorporating these sensors.

The invention claimed is:

1. A vibration sensor comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals,
   wherein the vibration sensor further comprises projecting portions formed on parts of an end portion of the weight member to project along a direction of the membrane surface and spaced from the membrane surface of the diaphragm electrode, and a restricting member for contacting the projecting portions of the weight member displaced along the direction of the membrane surface of the diaphragm electrode thereby to restrict displacement of the weight member.

2. A vibration sensor comprising a fixed electrode, and a diaphragm electrode having a weight member attached to a membrane surface facing away from the fixed electrode and fixedly supported at peripheries thereof, the vibration sensor being capable of outputting variations of capacitance between the fixed electrode and the diaphragm electrode as vibration signals,
   wherein the vibration sensor further comprises restricting members for contacting end portion of the weight member displaced along the direction of the membrane surface of the diaphragm electrode, thereby to restrict displacement of the weight member, the restricting members being formed on parts opposed to the end portion of the weight member and spaced from the membrane surface of the diaphragm electrode.

3. A vibration sensor as defined in claim 1 or 2, further comprising a second restricting member for contacting a surface of the weight member displaced along a direction perpendicular to the membrane surface of the diaphragm electrode, thereby to restrict displacement of the weight member.

4. A vibration sensor as defined in claim 3, further comprising a circuit board having an output circuit mounted thereon for vibration signals, wherein the circuit board or an electronic part mounted on the circuit board acts also as the second restricting member.

* * * * *